UNITED STATES PATENT OFFICE.

JOHN W. REES, OF UNIONTOWN, ASSIGNOR OF TWO-THIRDS TO WILLIAM L. WALLIS AND JOHN CARLEY, OF MERCER COUNTY, PENNSYLVANIA.

COMPOSITION FOR PLASTERING.

SPECIFICATION forming part of Letters Patent No. 322,751, dated July 21 1885.

Application filed March 13, 1885. (No specimens.)

*To all whom it may concern:*

Be it known that I, JOHN W. REES, a citizen of the United States, and a resident of Uniontown, in the county of Fayette and State of Pennsylvania, have invented a new and useful Composition of Matter to be Used in Plastering, of which the following is a specification.

My composition consists of the following ingredients, combined in about the proportions stated, viz: sand, eighteen bushels; lime, five bushels; combed manila, three pounds; sisal grass, two pounds; jute, one pound.

The combed manila, sisal grass, and jute are to be used in lengths of from one to four or six inches. These ingredients are to be thoroughly mingled by agitation. A sufficient amount of water is to be used in the mingling of my composition, so as to prepare it for use.

By the use of plastering composed of my composition much better results are obtained, a much smoother finish, and at a great saving, the sisal grass, combed manila, and jute being much superior to the hair used in the ordinary plastering, such as in general use.

What I claim, and desire to secure by Letters Patent of the United States, is—

The herein-described composition of matter to be used in plastering, consisting of sand, lime, combed manila, sisal grass, jute, and water, in about the proportions specified.

JOHN W. REES.

Witnesses:
W. C. BARR,
M. E. HARRISON.